3,155,109
LIQUID SUPPLY APPARATUS
Erik W. Anthon, Kensington, Calif., assignor to Research Specialties Co., Richmond, Calif., a corporation of California
Filed Aug. 29, 1961, Ser. No. 134,755
7 Claims. (Cl. 137—408)

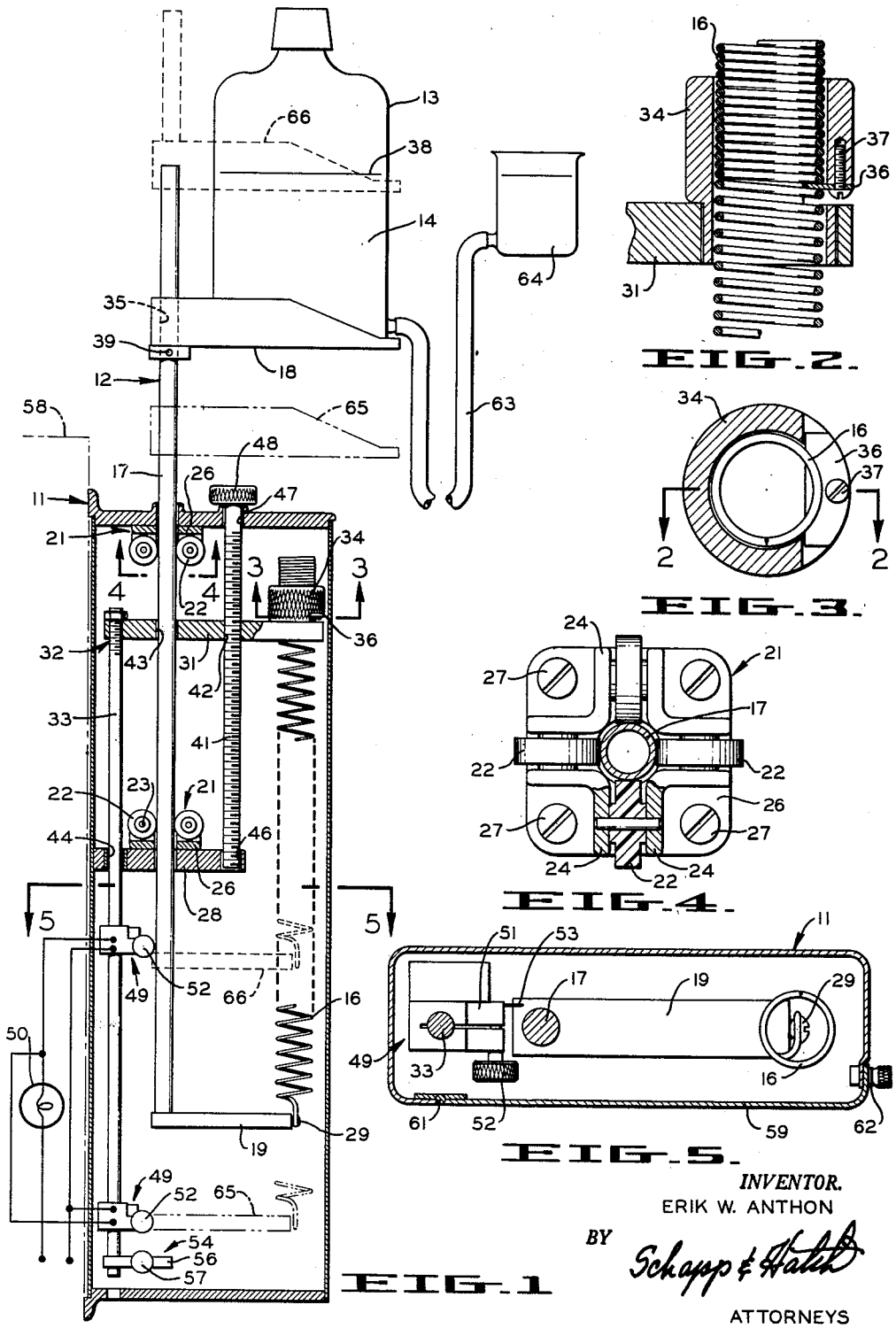

The present invention relates to improvements in a liquid supply apparatus, and more particularly to apparatus in which the upper surface of the liquid is maintained at a constant elevation.

Heretofore, constant level devices have generally utilized automatically operating valving means for maintaining the liquid level at the desired elevation. While these devices are satisfactory for the purpose intended, they generally require considerable quantities of rather intricate control elements to provide good accuracy and this involves expensive parts. In some cases, accuracy is forfeited in order to provide a less expensive device. These automatic valving devices require a constant source of supply and are limited to use with water taken from a hydrant or other bulk liquids available in large quantities. Accordingly, such systems are not practical for use with chemical reagents or the like used in certain chemical processes, analyses, medical testing and other similar applications.

The present invention provides an apparatus which overcomes the foregoing disadvantages and which maintains a fixed liquid level in a reservoir, the apparatus being adapted for use with all types of liquids regardless of their densities. The liquid level is maintained by spring means or equivalent resilient means constructed to raise the reservoir as the liquid is drawn off by a distance exactly equal to the distance the liquid level drops in the reservoir. In this way the level is maintained without the necessity of adding more of the liquid. This invention also provides for adjusting the spring means so as to accommodate liquids of different weight as well as to provide exceptionally fine accuracy.

Accordingly, it is a principal object of the present invention to provide a constant liquid level source or drain for use with equipment for performing chemical processes, analyses, medical testing and the like.

Another object of the invention is to provide a constant level apparatus suitable for liquids of various densities and different sizes of containers.

A further object of this invention is to provide a constant liquid level source of the character described in which means is provided for adjusting the initial liquid level at a desired elevation.

A still further object of the present invention is to provide a constant liquid level apparatus having a sensitive balance through means for minimizing horizontal forces on the vertically movable parts together with means for minimizing frictional resistance to desired vertical movement.

Further objects and advantages of my invention will be apparent as the specification progresses, and the new and useful features of my liquid supply apparatus will be fully defined in the claims attached hereto.

The preferred form of my invention is illustrated in the accompanying drawings forming part of this application, in which:

FIGURE 1 is a front elevational view, partly in section, of a constant liquid level apparatus constructed in accordance with the present invention.

FIGURE 2, a fragmentary sectional view taken substantially on the plane of line 2—2 of FIGURE 3;

FIGURE 3, a sectional view of a part of the apparatus taken substantially on the plane of line 3—3 of FIGURE 1;

FIGURE 4, a bottom view of a part of the apparatus, partly in section, as seen from line 4—4 of FIGURE 1; and FIGURE 5, a sectional view of the apparatus taken substantially on the plane of line 5—5 of FIGURE 1.

While I have shown only the preferred form of my invention, it should be understood that various changes or modifications may be made within the scope of the claims attached hereto without departing from the spirit of the invention.

Referring to the drawings in detail, it is seen that my constant liquid level apparatus comprises basically of a housing 11, support means 12 held vertically movable within said housing for supporting a container 13 and its liquid contents 14, and spring means 16 acting as the sole vertical support for the support means.

As shown in FIGURE 1, the support means 12 includes a substantially vertical shaft 17, a holder 18 for supporting the container 13 in place, and an arm 19 at the lower end of the shaft 17 to which spring 16 is attached. Shaft 17 is mounted for free vertical movement in a pair of bearing assemblies 21 which are preferably constructed to provide a minimum of friction. As best seen in FIGURE 4, each bearing assembly contains four rollers 22 mounted on axles 23 which in turn are mounted in bearings 24. Plates 26 and screws 27 serve to fasten the parts together and hold them in place on housing 11 and on a bracket 28 extending across the interior of housing 11, see FIGURE 1.

Preferably, the rollers are constructed of nylon and the bearing assemblies are made as frictionless as is commercially practicable to reduce frictional drag. Side thrust and other horizontal forces are reduced to a minimum so as to provide substantially uninhibited vertical movability of the shaft through the bearing assemblies.

As indicated above, the sole vertical support for the support means 12 and its associated load is the spring 16 which is attached to the arm 19 of the support means through a screw 29 or any equivalent means. The upper end of spring 16 is adjustably supported on a plate 31 of a frame 32 which also contains a rod 33. In order to effect the adjustable support for spring 16 on plate 31, there is provided a nut 34 which uses the spring coils as a screw thread. Specifically, the use of the spring as a screw thread is accomplished by securing a thin blade 36 to the nut 34 by means of screw 37 or the like, with the blade extending inwardly of the nut for engagement between two adjacent coils of the spring as best seen in FIGURE 2. The spring 16 is supported on blade 36 and hence rotation of the nut will lengthen or shorten the effective length of the spring depending on the direction of rotation. This, in turn, adjusts the spring constant of the spring. In other words, rotation of the nut changes the weight required to stretch the spring a specific unit of length.

As a specific example, a one gallon bottle containing water (specific gravity of 1) having a weight of 0.98 lb. per inch of height in the bottle may be balanced with about 75 coils of a spring ¾ inch in diameter and made of wire 0.064 inch in diameter. When the same bottle is filled with liquid having a specific gravity of 0.8, a balance is obtained by turning nut 34 until about 96 coils of spring are utilized. Similarly, balance is obtained for a liquid having a specific gravity of 1.3 in the container described above by shortening the spring to about 52 turns or coils. Although specific figures are given above for the sake of illustration, it is not necessary for the operator to have or use any knowledge of springs or mathematics of springs. Instead, he simply adjusts the nut 34 until the bottle and contents balance and the upper surface of the liquid stays at a constant elevation as liquid is added to or removed from the container.

In order to adjust the initial level 38 of liquid in the container 13, the holder 18 is raised or lowered on the shaft 17. This movement is possible because the holder has a bore 35 which is of a size such that the shaft 17 fits snugly but movably therethrough. When proper height is found, the holder is secured in place on the shaft by means of set screw 39. With the level thus adjusted, fine adjustment is achieved by vertical positioning of the frame 32 within the housing and this in turn adjusts the position of spring 16 and holder 18 supported thereby.

Positioning of the frame 32 is accomplished by rotation of screw 41 which threadably engages plate 31 at 42 so that the plate rides up or down on the threads depending on the direction of rotation. As shown in FIGURE 1, the plate 31 of frame 32 is free to move without interference from shaft 17 of holding means 12, the shaft passing through hole 43 in plate 31. There is no contact of plate 31 at hole 43 because friction to the support means must be minimized. However, a bearing support for frame 32 is obtained by having rod 33 slidably fit in snug relation through a bore 44 of bracket 28.

Screw 41 is held in position by having its lower end journaled into a socket 46 formed in bracket 28 and its upper end movably fitting through hole 47 of housing 11. A knurled knob 48 is provided on the upper end of screw 41 to provide means for rotating the screw and to give vertical support to the screw 41 and attached frame 32.

As an important feature of the invention, the present apparatus is adapted to incorporate signal means for showing when the container is nearly full and when it is nearly empty together with stop means for preventing the spring from stretching beyond its elastic limit. As here shown, the signal means may comprise microswitches 49 which are carried on rod 33 of frame 32 and connected to conventional warning devices such as a signal light 50.

As best seen in FIGURE 5, the switches 49 are carried on clamps 51, having knurled tightening screws 52, and are provided with feelers 53. The switches are adjustable on rod 33, by sliding the clamps therealong to a desired position where the clamps are secured by tightening the screws 52. The feelers 53 are positioned to be contacted by arm 19 of support means 12 when the same reaches the maximum desired raised or lowered positions. On contact the microswitches are activated and a signal is transmitted to the warning device. If desired, the signal may be sent through a relay to a warning system. Any suitable warning system such as lights, horns, bells, buzzers or the like may be utilized.

In order to protect the spring 16 from excessive stretching, stop means 54 is positioned at the bottom of rod 33, as shown in FIGURE 1. This stop means comprises a clamp 56 and knurled screw 57, which parts are similar in construction and operation to the corresponding parts of the clamps supporting microswitches 49. Accordingly, the stop means are vertically adjustable on the rod 33 with adjustment being achieved by loosening screw 57, sliding clamp 56 over rod 33 to the desired position and tightening screw 57 to secure the position of the stop means.

The unit may be mounted on the side of a work bench 58 as shown in FIGURE 1, if desired, or it may be mounted on a wall or otherwise held in vertical position. Suitable fastening means (not shown) are provided for this purpose. In order to reach the knurled nuts or screws 34, 48, 52 and 57, a door 59 is provided in housing 11 as best seen in FIGURE 5. This door is hung on hinges such as hinge 61 and is closed by latch 62. Access is provided to the knurled nuts mentioned above and associated adjustments when door 59 is opened, and these parts are hidden from view to provide an attractive unit when the door is closed.

In operation, the container is placed on holder 18 and liquid from the container passes through tube 63 to a well 64 where a constant liquid level is maintained. When a new container or new reagent is used, and adjustment is required, liquid may be run out and in through tube 63 into and out of well 64 to check the level. If adjustment is needed, nut 34 is turned while testing the level until a balance is obtained. After balancing, the level is adjusted roughly by loosening set screw 39 of holder 18, sliding the holder into the desired position and tightening set screw 39. The level is then further adjusted, if desired, by rotation of knob 48 which raises or lowers the spring 16 as explained above. If required, limit switches 49 and stop 54 may also be adjusted. The apparatus is then ready for use.

When the container is full, the spring is stretched and the supporting means is in a low position as illustrated in the lower phantom view identified by numeral 65 in FIGURE 1. At this time, the lower microswitch is activated indicating a full container. As liquid is removed, the spring contracts an amount equal to the depth of liquid removed to retain level 38 at a constant elevation. When about one-third of the liquid is used, the support means and container are in the position shown in solid lines in FIGURE 1. As more liquid is removed, the spring contracts further and the support means and container assume the upper position shown in phantom in FIGURE 1 and identified by numeral 66. At this position, the upper microswitch 49 is activated and the operator is warned that the container is nearly empty. The operator may then fill the container, and in this case no adjustment is necessary. If a new container or new reagent is to be used, it is then necessary to make adjustments as indicated above.

In order to hold friction to a minimum, and allow the spring force to balance the container and associated parts, the bearings used have a low coefficient of friction as mentioned above. In addition, the spring 16 is positioned so its axis intersects the center of gravity of the container and associated system. This reduces horizontal forces or side thrust on the bearings to a minimum. The limit switches are also preferably constructed with feelers which require a minimum of force to activate the switch so as to avoid upsetting the balance of forces achieved between the spring and the weight supported thereby.

I claim:

1. Apparatus for maintaining the level of liquid in a container in a fixed plane during changes in the amount of liquid present in the container, comprising a housing, support means held vertically movable within said housing for supporting the container and liquid contents, spring means providing the sole vertical support for said support means, and means for adjusting the spring constant of said spring means to provide a force per unit of change in length of the spring means equal to the force of gravity of the liquid per unit of depth of the liquid.

2. Apparatus for maintaining the level of liquid in a container in a fixed plane during changes in the amount of liquid present in the container, comprising a housing, support means held vertically movable within said housing for supporting the container and liquid contents, spring means providing the sole vertical support for said support means, means for adjusting the spring constant of said spring means to provide a force per unit of change in length of the spring means equal to the force of gravity per unit of depth of liquid, said support means containing a substantially vertical member held in bearings for free vertical movement, a holder for positioning the container on said support means, and means for connecting the spring means to said vertical member.

3. The apparatus defined in claim 2, in which the vertical force of said spring means lies in substantially the vertical line of the center of gravity of the combined masses of the container, the liquid held within the container and the vertically movable support means.

4. Apparatus for maintaining the level of liquid in a container in a fixed plane during changes in the amount of liquid present in the container, comprising a housing, support means held vertically movable within said housing for supporting the container and liquid contents, spring means providing the sole vertical support for said support means, means for adjusting the spring constant of said spring means to provide a force per unit of change in length of the spring means equal to the force of gravity per unit of depth of liquid, means for attaching said spring means to said housing, and means for adjusting the vertical position of the spring means with respect to said housing.

5. Apparatus for maintaining the level of liquid in a container in a fixed plane during changes in the amount of liquid present in the container, comprising a housing, support means held vertically movable within said housing for supporting the container and liquid contents, spring means providing the sole vertical support for said support means, means for adjusting the spring constant of said spring means to provide a force per unit of change in length of the spring means equal to the force of gravity per unit of depth of liquid, means for attaching said spring means to said housing, means for adjusting the vertical position of the spring means with respect to said housing, said support means containing a substantially vertical member held in bearings for free vertical movement, a holder for positioning the container on said support means, and means for connecting the spring means to said vertical member.

6. Apparatus for maintaining the level of liquid in a container in a fixed plane during changes in the amount of liquid present in the container, comprising a housing, support means held vertically movable within said housing for supporting the container and liquid contents, spring means providing the sole vertical support for said support means, means for adjusting the spring constant of said spring means to provide a force per unit of change in length of the spring means equal to the force of gravity per unit of depth of liquid, means for attaching said spring means to said housing, means for adjusting the vertical position of the spring means with respect to said housing, said support means containing a substantially vertical member held in bearings for free vertical movement, a holder for positioning the container on said support means, means for connecting the spring means to said vertical member, and signal means actuated by said support means on movement to extreme position whereby indications of relative emptiness may be given.

7. The apparatus defined in claim 6, in which the vertical force of the spring means lies in substantially the vertical line of the center of gravity of the combined masses of the container, the liquid held within and the vertically movable support means.

References Cited in the file of this patent

UNITED STATES PATENTS

| | | |
|---|---|---|
| 1,005,780 | Raber | Oct. 10, 1911 |
| 1,023,490 | Beck et al. | Apr. 16, 1912 |
| 1,473,097 | Holbrook | Nov. 26, 1923 |
| 2,281,444 | Julin | Apr. 28, 1942 |
| 2,716,423 | Landgraf | Aug. 30, 1955 |
| 2,742,920 | Tillman | Apr. 24, 1956 |

Dedication 3,155,109.—*Erik W. Anthon*, Kensington, Calif. LIQUID SUPPLY APPARATUS. Patent dated Nov. 3, 1964. Dedication filed Mar. 2, 1970, by the assignee, *American Optical Corporation*.
Hereby dedicates the remaining term of said patent to the Public.
[*Official Gazette July 7, 1970.*]